Sept. 20, 1949.                K. A. BROWNE                2,482,460
                        TWO-SPEED PROPELLER DRIVE SYSTEM
Filed Oct. 10, 1941                                     3 Sheets-Sheet 1
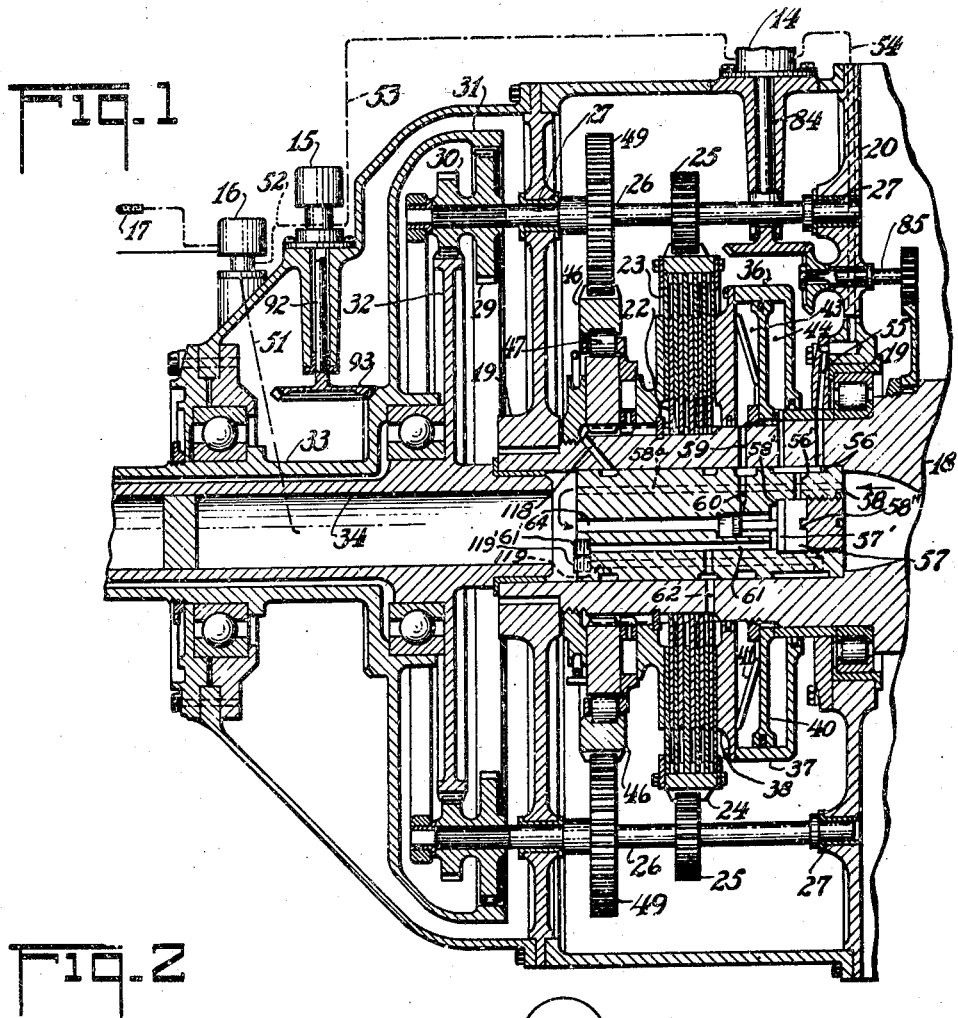
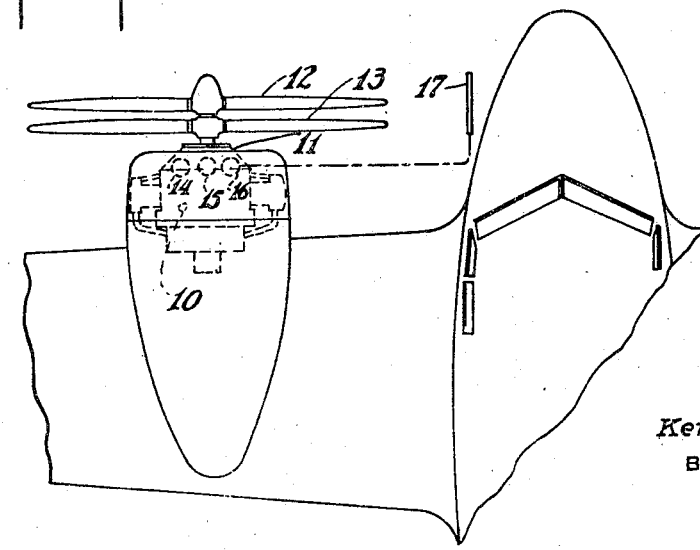
INVENTOR
Kenneth A. Browne.
BY
ATTORNEY Sept. 20, 1949.  K. A. BROWNE  2,482,460
TWO-SPEED PROPELLER DRIVE SYSTEM
Filed Oct. 10, 1941  3 Sheets-Sheet 2
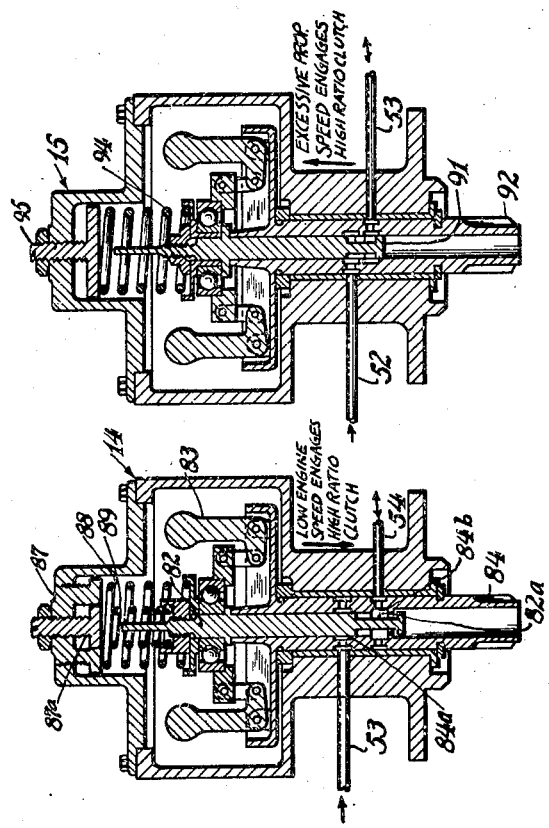
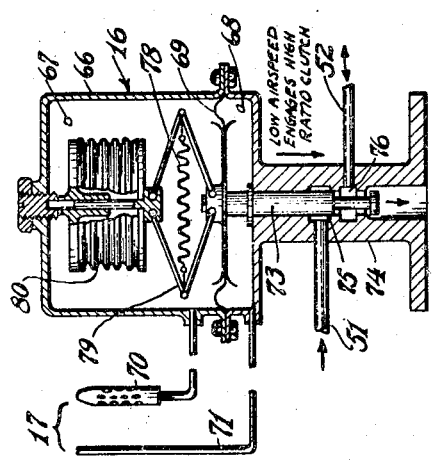
INVENTOR
Kenneth A. Browne.
BY
ATTORNEY Sept. 20, 1949.  K. A. BROWNE  2,482,460
TWO-SPEED PROPELLER DRIVE SYSTEM
Filed Oct. 10, 1941  3 Sheets-Sheet 3
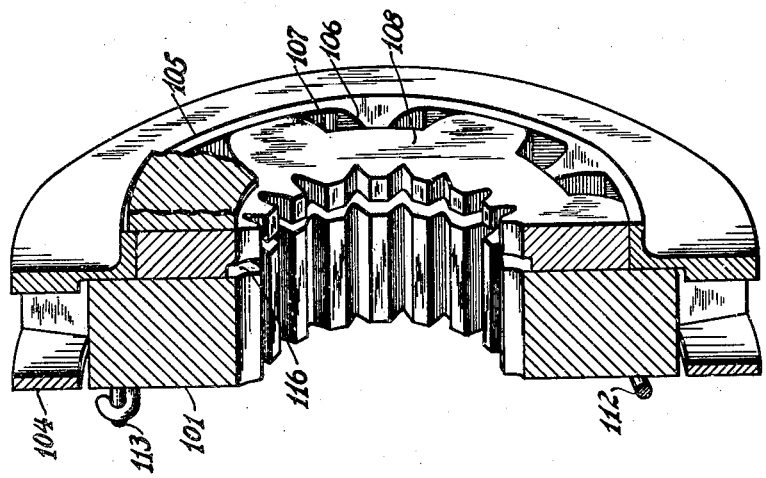
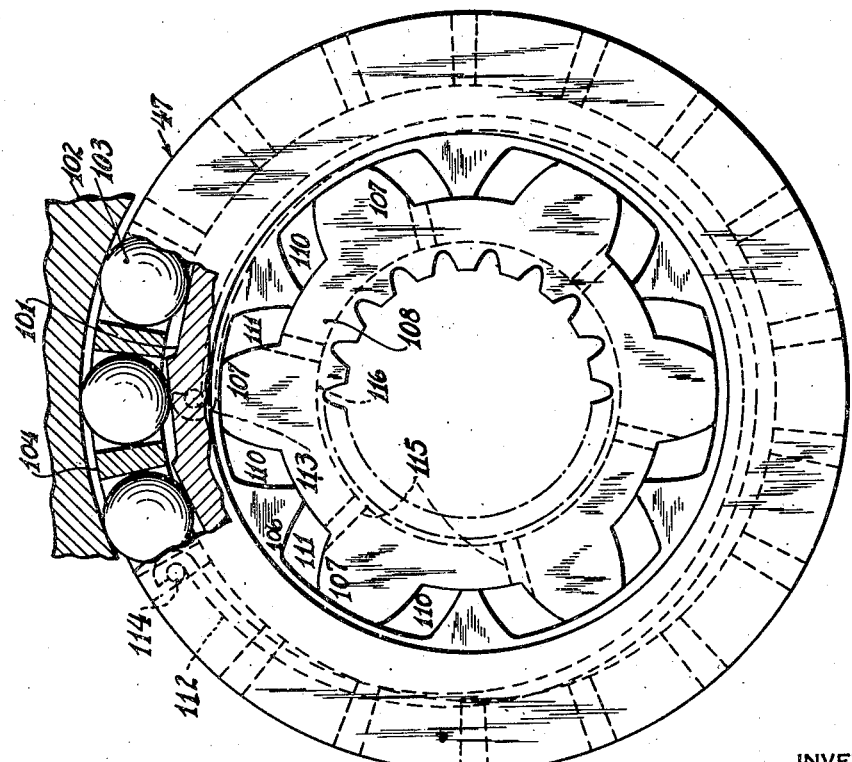
INVENTOR
Kenneth A. Browne.
BY
ATTORNEY Patented Sept. 20, 1949

2,482,460

UNITED STATES PATENT OFFICE 2,482,460

TWO-SPEED PROPELLER DRIVE SYSTEM

Kenneth A. Browne, Ridgewood, N. J., assignor to Wright Aeronautical Corporation, a corporation of New York Application October 10, 1941, Serial No. 414,449

15 Claims. (Cl. 170—135.75)

This invention relates to aircraft and is particularly concerned with variable ratio transmission systems between an aircraft engine and an aircraft propeller, and with automatic control apparatus for the transmission.

When controllable pitch propellers came into general use on aircraft, at times when aircraft speeds were moderate, a single drive ratio from an engine to the propeller was considered adequate, and changes in propeller pitch under varying airspeed conditions were adequate to maintain propeller operation at fairly good efficiency under the engine power condition required. As development of aircraft has progressed in the direction of higher speed, the controllable pitch propeller has become absolutely essential and the need for variable ratio transmission gearing between the propeller and engine becomes evident in connection with the controllable pitch propeller. The prior art shows two-speed or more than two-speed propeller gears and the general intention, in their use, is to allow of high speed propeller operations at low airspeeds and to allow of low speed propeller rotation at high airspeeds. One of the esential limitations in propeller operation is the helical tip speed of the blades which must, in order to retain reasonable propeller efficiency, be substantially less than the velocity of sound or about 1100 feet per second. If propeller speed is high at high airspeeds, it is reasonably obvious that the helical tip speed of the propeller blades will be the resultant of the tangential and forward velocity component and in the case of a 12¼ ft. propeller rotating at 1260 R. P. M., the helical tip speed becomes 883 ft. per second at 240 miles per hour airspeed. Obviously, if the airspeed is to be increased materially, the helical tip speed would increase therewith and when such tip speed increases beyond about 950 ft. per second it becomes necessary to rotate the propeller at lower R. P. M. and to increase its pitch to secure efficient propeller performance.

An object of the present invention is to provide a multi-speed propeller transmission whose ratio change is controlled automatically to hold propeller R. P. M. at a level, regardless of engine R. P. M. and airspeed, where the helical tip speed of the propeller blades will be well below the velocity of sound. A further object of the invention is to provide propeller transmission gearing responsive in its ratio changing to airspeed. A further object is to provide a response in the same mechanism to engine R. P. M. and an additional object is to provide a response in the system to both airspeed and engine R. P. M.

Still another object is to provide a control system for a multi ratio propeller transmission which will automatically shift the transmission to higher ratios as the propeller tends to overspeed as in steep glides or dives and still allow positive torque without excessive rotational speed of the engine. As used in the specification and claims, unless otherwise specified, the "speed ratio" of the transmission always refers to the ratio of the speed of the transmission output member to the speed of its input member.

A further object of the invention is to provide a two-speed transmission gear having certain novel features as to its gearing and shifting mechanism while an additional object is to provide a novel form of roller clutch or roller brake control whereby the rollers are moved into and out of position for driving engagement accordingly as driving or non-driving engagement is likely to occur, thereby to decrease wear and to insure fast and positive engagement of the roller clutch with minimum slippage. A further object of the invention is to provide a novel form of airspeed governor for a propeller transmission system or for other analogous purposes.

To show wherein different propeller speeds are necessary under different airspeed and engine speed conditions, one may consider a pursuit type airplane with a high speed of 470 M. P. H. having a 12¼ ft. three-bladed propeller absorbing 2,000 horsepower, the propeller turning at 900 R. P. M. in "low gear." Under these conditions, the helical tip speed of the propeller blades is 900 ft. per second and the value V/ND is 3.75 which value is more or less proportional to propeller blade pitch. Now, for the same airplane climbing at 240 M. P. H. at full power, with the propeller rotating at 1260 R. P. M. (high ratio propeller gear) the helical tip speed of the blades would be 883 ft. per second and V/ND would be 1.37.

Assuming a maximum range cruising speed of about 330 miles per hour whereat the engine is operating at 33% power and at 50% speed, the propeller would rotate at 630 R. P. M. in high gear and in this condition the propeller helical tip would be 630 ft. per second and V/ND would equal 3.76. If it becomes necessary for the last-named operating phase to go to full-power, high-speed operation it is apparent that, to keep the helical tip speed and V/ND ratio within reasonable values, it will be necessary to reduce propeller speed relative to the engine whereupon the first-named operating phase may be reached. In fact, maximum cruising power rather than best economy operation would necessitate a change to low ratio in the propeller gear to secure a plane speed of about 410 M. P. H. to hold the V/ND value to 3.85 and the propeller helical tip speed to 770 ft. per second.

From the above it may be seen that a two-speed gear will be adequate for presently anticipated conditions of airplane operation, but more than two speeds, and in fact, an infinite number of speeds may become desirable in the future. In all cases, the control of the transmission should be automatic to relieve the pilot of the need for establishing the propeller ratio. Since we have automatic propellers, automatic transmissions may properly go along with them so that all the pilot need do is to preset the engine power at which he desires to operate whereupon optimum speed and economy will automatically follow. The provisions of this invention include control mechanisms for a specific form of two-speed gear but it will become obvious that the control system features may be applied in principle to transmissions having more than the two speed ratios shown.

In the embodiment chosen for illustration,

Fig. 1 is a longitudinal section through a two-speed propeller transmission according to the invention;

Fig. 2 is a fragmentary plan of an airplane including the provisions of the invention;

Fig. 3 is a section through an airspeed responsive transmission control;

Fig. 4 is a section through an engine-speed responsive transmission control;

Fig. 5 is a section through a propeller-speed responsive transmission control;

Fig. 6 is an enlarged end view, partly in section, of a roller clutch forming part of the transmission; and Fig. 7 is a perspective view partly in section of part of the roller clutch.

Referring first to Fig. 2, an airplane engine 10 is shown to the front end of which the change speed transmission 11 is secured, said transmission carrying concentric propeller shafts upon which are mounted oppositely rotating propellers 12 and 13. 14, 15 and 16 respectively represent the engine speed, propeller speed, and airspeed responsive control units shown in Figs. 4, 5, and 3, the latter being connected with a Pitot-static tube 17 subject in its action to the ambient air in which the aircraft is operated.

The transmission itself is shown in Fig. 1 and comprises an engine power shaft 18 supported in bearings 19 in the engine casing 20, said shaft having a plurality of clutch plates 22 splined thereto for frictional engagement with a plurality of alternate clutch plates 23 splined at their peripheries to a gear 24 meshed with a plurality of gears 25 on layshafts 26 borne at 27 in the engine casing 20. These layshafts, at their forward ends, carry gears 29 and 30 respectively meshed with a ring gear 31 and a gear 32 respectively rigid with an outer propeller shaft 33 and an inner propeller shaft 34 by which the propellers 13 and 12 are carried.

The friction clutch 22, 23 is engaged by a hydro-spring cell 36 comprising an axially slidable cylinder 37 having an abutment 38 engaging the end clutch plate 23. Within the cylinder is a piston 40 secured to the shaft 18. Between the abutment 38 and the piston 40 is a spring 41 urging the clutch 22, 23 into engagement. Oil pressure may selectively be admitted to either side of the piston 40—when admitted to the lefthand cell 43, clutch engaging pressure is augmented, and when fluid pressure is admitted to the righthand cell 44, the clutch is disengaged.

At such times as the clutch is disengaged, a low ratio drive is afforded through a gear 46 having a one-way roller clutch connection 47 with the crankshaft 18, said gear 46 engaging a plurality of gears 49 on the several layshafts 26, said gears 49 being larger than the layshaft gears 25 to give a lower drive ratio than is afforded by the gears 25 as meshed with the gear 24.

The details of the roller clutch 47 will be described later but from the structure thus far recited, it will be apparent that when the clutch 22, 23 is engaged, the layshafts 26 will be driven at high speed to afford a high ratio drive for the propellers during which time the roller clutch 47 overruns. As the clutch 22, 23 is released, the drive drops back to low ratio on the roller clutch 47.

The governor devices 14, 15 and 16 are arranged in series, one (the airspeed control 16) being fed with pressure oil through a line 51 communicating with the hollow of the crankshaft 18 which acts as a pressure oil distributor from the engine oil pump, not shown. The unit 16 is serially connected through an oil pressure passage 52 with the propeller speed control device 15. This in turn is serially connected through a pipe 53 with the engine speed control device 14 which in turn is connected by a pipe 54 and appropriate drillings in the engine casing with an oil transfer bearing 55 and passages 56 leading to the righthand cavity 44 of the cell 36 and to a cylinder 57 formed in a plug 58 within the crankshaft hollow. The plug 58 is provided with one or more passages 58a for transmitting oil pressure therethrough. Obviously, if all of the control devices 14, 15 and 16 are open, oil pressure will be directed to the cell cavity 44 for disengagement of the clutch 22, 23 to afford low ratio propeller drive. As will hereinafter appear from the detailed description of the devices 14, 15, and 16, when any one of these devices operates to close the oil pressure passage to the cell cavity 44, it at the same time vents its associated outlet port to the engine crankcase. As oil pressure is admitted to the cavity 44, it is also admitted, through passage 56', to the cylinder 57 which drives, leftwardly, a differential piston 57' allowing bleed of fluid from the cell cavity 43 through passages 59, 60, 61 and 62 to the interior of the engine casing. An annular shoulder 58' at the left end of the cylinder 57 limits the leftward movement of the piston 57' to the position illustrated in Fig. 1 to prevent the piston from covering the passage 61. When pressure oil supply to the cavity 44 and to the cylinder 57 is cut off by any one of the governing devices 14, 15 or 16, the cell cavity 44 and the cylinder 57 are vented at the particular governing device cutting off the oil pressure. Thereupon oil pressure within the crankshaft drives the differential piston 57' to the right, by its action through the passage 64, to uncover passage 60 whereby pressure oil enters the cavity 43 through the passages 64, 60 and 59. This oil pressure in the cavity 43 augments the action of the spring 41 enforcing engagement of the clutch 22, 23 thereby affording the high ratio propeller drive. A stop 58' is located so as to limit the movement of 57' to the right to prevent the piston from covering or moving beyond the passage 56'.

Now reference may be made to Fig. 3 which shows the details of the airspeed responsive control device 16. This device includes a housing 66 divided into two chambers 67 and 68 by a yielding diaphragm 69. The chamber 67 is connected to a static tube 70 while the chamber 68 is connected to a Pitot tube 71, the elements 70 and 71 together comprising the Pitot-static element 17 shown in Fig. 2. High airspeed produces a differential pressure between the cavities 67 and 68 tending to raise the diaphragm 69 while low airspeeds tend to lower said diaphragm. The diaphragm carries a valve stem 73 engaging the valve housing 74 provided with ports 75 and 76 on the pipes 51 and 52 respectively. When the valve stem 73 is in the low position shown, oil pressure is isolated from the pipe 52 and the pipe 52 and port 76 are vented downwardly to the engine crankcase through the housing 74, thus controlling the transmission to high ratio. When the stem 73 is raised in response to high airpeed, the pipes 51 and 52 are placed in communication to supply oil pressure to the transmission system provided the engine speed and propeller speed responsive control devices also allow the passage of pressure oil to the transmission. The point at which shift of the valve stem 73 takes place is established by a spring 78 connected to the ends of a pantograph 79 whose other ends are connected to the valve stem and to a calibrating bellows 80 within the cavity 67 which bellows serves to compensate for changes in atmospheric density due to altitude, making valve stem operation responsive to true airspeed rather than indicated airspeed as would obtain if the bellows 80 were not present. The pantograph and spring arrangement allows of snap action of the valve stem. It also allows of a reasonably wide speed range between opening and closing of the valve stem to prevent hunting or rapid transition between on and off positions at some critical intermediate airspeed. That is, with the apparatus shown, the valve stem will allow shift to low ratio at some certain airspeed but will prevent shift back to high ratio until an airspeed differential of 30 or 40 miles per hour has been made.

The engine speed responsive control device 14 shown in Fig. 4 is in general similar to centrifugal flyweight governors having a hydro valve control, as are used in other environments. It consists of a hydro valve stem 82 which is raised and lowered in response to increase and decrease in centrifugal force due to the rotational speed of the flyweights 83, the latter being driven rotationally through a hollow shaft 84 geared, as shown in Fig. 1, to the crankshaft 18 through a gear train 85. The stem 82 includes a groove 82a and the sleeve 84 forms a valve port unit operating in conjunction with the stem 82 to allow of fluid flow from the pipe 53 to the pipe 54 at high engine speed, through the interconnection of sleeve port 84a with sleeve port 84b through the stem groove 82a. At low engine speed, the stem 82 isolates the port 84a from the port 84b, the latter being vented below the port 84b to the crankcase interior. Should the valve stem 82 rise excessively due to excessively high engine speed, the flange on the stem 82 defining the bottom of the groove 82a will rise into the port 84b, allowing spillage of oil from the pipe 54 permitting partial engagement of the main friction clutch 22, 23. Adjustment of the engine speed range at which normal opening and closing take place, is made through an abutment 87 acting through a spring 88, the rate of the spring 88 being chosen as to low rate and precompression to give snap action of the valve stem whereby a differential of one or two hundred R. P. M. in the engine is necessary to close the valve after it has been opened, or to open it after it has been closed.

An auxiliary spring 89 is nested within the spring 88, said auxiliary spring being normally clear of the auxiliary spring abutment 87a except when the valve stem is in the position to establish oil transfer from the port 84a to the port 84b. When engine speed becomes sufficient to cause the flyweights 83 to overcome the initial load on the spring 88, snap-action motion of the valve will immediately bring the end of the spring 89 into engagement with its abutment 87a. However, should the engine overspeed be sufficient, both springs 88 and 89 acting together may be compressed upon excessive rise of the valve stem to afford fluid bleed as above indicated from the sleeve port 84b. This may happen upon release of the high speed clutch 22, 23 whereupon engine speed rises before propeller speed drops to that R. P. M. corresponding to normal engine R. P. M. and propeller R. P. M. in low gear. This sudden speed rise of the engine is suppressed by the partial engagement of the friction clutch 22, 23 to prevent running away of the engine under no load. As soon as propeller pitch adjustment has been made to control engine speed with the propeller operating at the lower R. P. M. caused by the low ratio drive, the system resumes normal operation in low gear with the ports 82a and 84b of the governor 14 in communication with one another.

By suitable adjustment of the airspeed responsive device 16 and the engine speed responsive device 14, the engine and airspeed conditions at which shift between high and low gear is desired may be established. As an added safety provision, the propeller speed responsive device 15 is placed in series with the other two devices to cut off oil pressure to the clutch cell 36, to engage high ratio, at such times as the propeller may exceed an R. P. M. corresponding to the maximum allowable engine R. P. M. in high gear. Thereby, shift of the transmission to high gear is made to prevent engine overspeeding and to prevent the propeller from free wheeling in the airstream which might occur in low gear due to the one-way drive afforded in low gear by the roller clutch 47. Accordingly, the propeller will be connected to the engine in high ratio should it tend to overspeed even though the engine speed and airspeed normally call for low ratio. The propeller speed responsive governor, as shown in Fig. 5, is also a centrifugally operated oil valve comprising a stem 91 which when raised allows communication from the pipe 52 to the pipe 53 and which when lowered severs such connection and vents its outlet pipe 53 downwardly into the crankcase through the hollow sleeve 92. Lowering of the valve is effected by low speed rotation of the propeller which drives a flyweight carrying sleeve 92 through gearing 93 (shown in Fig. 1). The speed at which valve opening and closing takes place is controlled by a spring 94 adjusted by an abutment 95. The spring rate is selected so the flyweights move with snap action.

From the above description it is seen that the devices 14, 15, and 16 control serially disposed valve elements 73, 82, and 91 in the fluid pressure line, composed of sections 51, 52, 53, and 54, to the hydraulic cell cavity 44. Thus, fluid pressure is transmitted to the cell cavity 44 only when all of these valves are open. Upon operation of any one of the devices 14, 15, or 16, its associated fluid pressure inlet port is closed and its outlet port is vented to the crankcase, thereby cutting off the transmission of fluid pressure to the cell cavity 44 and at the same time venting this cavity to the crankcase.

To summarize the shift between high and low ratio; for high ratio it is necessary that the clutch 22, 23 be engaged and that oil pressure to the cavity 44 be cut off. Therefore, if any one of the devices 14, 15 or 16 is closed, the transmission will remain in high ratio. High ratio is enforced if airspeed is low or if engine speed is low or if propeller speed is above normal maximum. In order for the transmission to shift to low ratio, it is necessary that pressure fluid be present in the cavity 44 whereby the clutch 22, 23 is disengaged. For such pressure in the cavity 44 the airspeed must be high and the engine speed must be high and the propeller speed must be below normal maximum.

If more than a two ratio propeller transmission be used, the same sort of control mechanism may be used, arranging airspeed and engine speed values in such relationship that different orders of such speed will effect shifting of the transmission to any one of the several available ratios.

Reference may now be made to Figs. 6 and 7 which show the details of the construction of the roller clutch 47. This device comprises an inner race 101 having peripheral sloped tracks or ramps and an outer race 102 having a cylindrical bore. A plurality of rollers 103 are disposed between the races 101 and 102 and the rollers are loosely embraced by a cage 104 having a plurality of cavities, one for each roller 103. The cage 104 is provided with a lateral extension 105 having circumferentially spaced internal gear teeth or splines 106. These are shown with the form of internal gear teeth, which is a convenient form for fabricating purposes, but they may also be fabricated merely as inwardly directed vanes. These teeth 106 alternate, in spaced relationship, with outwardly extending teeth or vanes 107 formed on a member 108 rotationally rigid with the inner race 101 of the roller clutch. The vanes 106 and 107 define therebetween a plurality of cavities 110 and 111 allowing of limited circumferential movement between the elements 104 and 108, this movement being of such order as to be substantially equal to the possible circumferential movement of the rollers 103 on the ramps of the inner race 101 between their full driving position and their fully disengaged position. By valving pressure fluid into the cavities 111, the cage 104 is moved clockwise relative to the race 101 to enforce movement of the rollers to their driving position. The rollers will of course drive when driving torque on the race 102 is clockwise with respect to the race 101. If pressure fluid is relieved from the cavities 111, the cage 104 may move counter clockwise with respect to the race 101 to move the rollers 103 leftwardly along the ramps as shown in part in Fig. 6, out of any possible driving engagement between the races 101 and 102, such movement being enforced by a torsion spring 112 anchored at 113 to the race 101 and at 114 to the cage 104. Admission of pressure fluid to the cavities 111 is through radial drillings 115 communicating with an annulus 116 between the elements 101 and 108. Referring back to Fig. 1, this annulus is in communication, through drillings 118 and 119, with the passage 56. As was pointed out previously, fluid pressure existing in this passage 56 serves to disengage the friction clutch 22, 23 and when such disengagement occurs, the roller clutch 47 should be ready for engagement. Thus, the fluid pressure serving to disengage the friction clutch makes the roller clutch ready for engagement. When the referred to oil pressure is cut off, the friction clutch is engaged and likewise the roller clutch is disengaged allowing the spring 112 to hold the rollers out of forced contact with their races 101 and 102 to minimize wear in the roller clutch unit.

At this point it should be noted that for convenience fluid passages 64 and 119 are both drilled from the left and, accordingly, plugs 64' and 119' are provided for closing their respective left ends as seen in Fig. 1.

As indicated previously, the propellers 12 and 13 are of controllable pitch constant speed type and they should be controlled to crankshaft speed rather than to propeller shaft speed. In other words, the propeller pitch changing system could be associated with the engine crankshaft whereby pitch changes are made in the propellers to hold engine speed constant for any given setting of the governor. It has not been considered necessary to show the details of propeller controls since they are well known in the art. For this, reference may be made to any one of a number of different patents or to Chillson application Serial No. 261,879, filed March 15, 1939 (Patent 2,449,452, dated September 14, 1948).

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a multi-ratio transmission between an aircraft engine and its propeller, a normally engaged friction clutch establishing one drive ratio, hydraulic cell means which when subjected to fluid pressure is operative to disengage said clutch, a pressure fluid supply, and means to control the admission of pressure fluid to, and to control the evacuation of fluid from said cell, responsive in its operation to aircraft speed, engine speed, and propeller speed.

2. In combination with an aircraft having an engine, a multi-ratio transmission connecting said engine and propeller, a normally engaged clutch establishing one drive ratio, hydraulic cell means which when subjected to fluid pressure is operative to disengage said clutch, a source of fluid pressure, a pair of serially connected valves arranged to admit fluid from said source to said cell when both said valves are open and to bleed fluid from said cell when any of said valves is closed, and means operative in response to changes in aircraft speed and engine speed for controlling said pair of valves.

3. In combination with an aircraft having an engine and a propeller, a multi-ratio transmission connecting said engine and propeller, a normally engaged clutch establishing one drive ratio, hydraulic cell means which when subjected to fluid pressure is operative to disengage said clutch, a source of fluid pressure, three serially connected valves arranged to admit fluid from said source to said cell when all said valves are open and to bleed fluid from said cell when any of said valves is closed, and means operative in response to changes in aircraft speed, engine speed and propeller speed for controlling said valves.

4. In combination with an aircraft having an engine and a propeller, a multi-ratio transmission connecting said engine and propeller, and an aircraft airspeed responsive device operative in response to changes in said airspeed for shifting the drive ratio of said transmission, said device comprising a housing having a diaphragm defining within the housing two chambers subjected to static air pressure and to dynamic air pressure respectively of the air about the aircraft, means actuated by movements of said diaphragm for changing the transmission ratio, and snap-action elastic means tending to hold the diaphragm in either of two extreme positions of movement.

5. In combination with an aircraft having an engine and a propeller, a transmission arranged to drivably connect said engine with said propeller at any one of a plurality of speed ratios, means responsive to changes in engine speed, means responsive to changes in aircraft speed, and means controlled by both said responsive means for automatically regulating the speed ratio at which said transmission drivably connects said propeller to said engine.

6. In combination with an aircraft having an engine and a propeller, a transmission arranged to drivably connect said engine with said propeller at any one of a plurality of speed ratios, means responsive to aircraft airspeed, means responsive to engine speed, and means controlled by both said responsive means to automatically reduce the speed ratio at which said transmission drivably connects the engine to the propeller when the aircraft airspeed and the engine speed respectively exceed predetermined values.

7. In combination with an aircraft having an engine and a propeller, a transmission arranged to drivably connect said engine with said propeller at any one of a plurality of speed ratios, means responsive to engine speed, means responsive to aircraft airspeed, and means controlled by said responsive means to automatically reduce the speed ratio at which said transmission drivably connects the engine to the propeller when both the engine speed and the aircraft airspeed respectively exceed predetermined values and to automatically increase said speed ratio when the engine speed or the aircraft airspeed respectively fall below said predetermined values.

8. In combination with an aircraft having an engine and a propeller, a transmission arranged to drivably connect said engine with said propeller at any one of a plurality of speed ratios, a normally engaged clutch establishing one speed ratio, at which said transmission drivably connects said engine and propeller, hydraulic cell means which, when subjected to fluid pressure, is operative to disengage said clutch to establish a second such speed ratio drive, and means responsive to changes in aircraft speed to automatically control the admission of fluid pressure to and the evacuation of fluid pressure from said cell means.

9. In combination with an aircraft having an engine and a propeller, a transmission arranged to drivably connect said engine with said propeller at any one of a plurality of speed ratios, a normally engaged friction clutch establishing one speed ratio at which said transmission drivably connects said engine and propeller, hydraulic cell means which when subjected to fluid pressure is operative to disengage said clutch to establish a second such speed ratio drive, and a pair of means responsive to aircraft airspeed and engine speed respectively, for automatically controlling the admission of fluid pressure to and the evacuation of fluid pressure from said cell means.

10. In combination with an aircraft having an engine and a propeller, a transmission arranged to drivably connect said engine with said propeller at any one of a plurality of speed ratios, a source of fluid pressure, fluid pressure responsive means connected to said source and operable to vary the transmission speed ratio, and a pair of serially disposed valves controlling the connection of said source of fluid pressure to said responsive means, one of said valves being automatically controlled in response to changes in aircraft airspeed and the other of said valves being automatically controlled in response to changes in engine speed.

11. In combination with an aircraft having an engine and a propeller; a multi-speed transmission having its input member drivably connected to said engine and its output member drivably connected to said propeller to drivably connect said engine with said propeller at any one of a plurality of speed ratios greater than zero; a member subjected to an movable by a fluid pressure differential variable with changes in aircraft airspeed; and means operatively connected to said member to automatically duce the speed ratio, at which said transmission drivably connects the engine to the propeller, when the aircraft airspeed exceeds a predetermined value.

12. In combination with an aircraft having an engine and a propeller; a multi-speed transmission having its input member drivably connected to said engine and its output member drivably connected to said propeller to drivably connect said engine with said propeller at any one of a plurality of speed ratios greater than zero, said transmission including a clutch; means for urging engagement of said clutch to establish one of said speed ratios; means adapted to effect disengagement of said clutch to establish a second of said speed ratios; a member subjected to and movable by a fluid pressure differential variable with changes in aircraft airspeed; and means operatively connected to said member to operate said disengaging means.

13. In combination with an aircraft having an engine and a propeller; a multi-speed transmission having its input member drivably connected to said engine and its output member drivably connected to said propeller to drivably connect said engine with said propeller at any one of a plurality of speed ratios greater than zero, said transmission including a friction clutch engageable to effect a high transmission speed ratio and disengageable to effect a low transmission speed ratio; means automatically movable from a first position, through a second position, to a third position in response to engine speed change from a low speed, through a high speed, to a higher speed respectively; and means controlled by said movable means so as to effect engagement, disengagement and partial engagement of said clutch upon movement of said means to its first, second and third positions respectively.

14. In combination with an aircraft having an engine and a propeller; a multi-speed transmission having its input member drivably connected to said engine and its output member drivably connected to said propeller; said transmission being arranged to drivably connect said engine with said propeller at first and second speed ratios such that in said first speed ratio said propeller is driven at relatively high torque and low speed and in said second speed ratio said propeller is driven at relatively low torque and high speed; a flexible diaphragm subjected to a fluid pressure differential variable with changes in aircraft airspeed; and means operatively connected to said diaphagram for automatically shifting said transmission to said first speed ratio at high aircraft airspeeds.

15. In combination with an aircraft having an engine and a propeller; a multi-speed transmission having its input member drivably connected to said engine and its output member drivably connected to said propeller; said transmission being arranged to drivably connect said engine with said propeller at first and second speed ratios such that in said first speed ratio said propeller is driven at relatively high torque and low speed and in said second speed ratio said propeller is driven at relatively low torque and high speed; means responsive in its operation to aircraft airspeed; and means movable relative to and controlled by said responsive means for automatically shifting said transmission to said first speed ratio at high aircraft airspeeds.

KENNETH A. BROWNE.

REFERENCES CITED

The following references are of record in the file of this patent:

UNITED STATES PATENTS

| Number | Name | Date |
|---|---|---|
| Re. 21,198 | Nardone | Sept. 5, 1939 |
| 784,285 | Sturtevant | Mar. 3, 1905 |
| 861,366 | John | July 30, 1907 |
| 907,711 | Anthony | Dec. 29, 1908 |
| 1,654,432 | Rowledge | Dec. 27, 1927 |
| 1,717,294 | Wojtycski | June 11, 1929 |
| 1,726,329 | Aiken | Aug. 27, 1939 |
| 1,755,804 | Barbarou | Apr. 22, 1930 |
| 1,769,193 | Stone | July 1, 1930 |
| 1,795,135 | Molly | Mar. 3, 1931 |
| 1,823,113 | Miller | Sept. 15, 1931 |
| 1,955,455 | Ford | Apr. 17, 1934 |
| 1,949,263 | Havill | Feb. 27, 1934 |
| 1,983,827 | Winther | Dec. 11, 1934 |
| 1,993,454 | Paterson | Mar. 5, 1935 |
| 1,995,467 | Bongiovanni | Mar. 26, 1935 |
| 2,003,857 | Hale | June 4, 1935 |
| 2,056,050 | Harris | Sept. 29, 1936 |
| 2,059,122 | Lansing | Oct. 27, 1936 |
| 2,102,781 | Bieretz | Dec. 21, 1937 |
| 2,133,656 | Caldwell | Oct. 18, 1938 |
| 2,177,872 | Dunn | Oct. 31, 1939 |
| 2,217,364 | Halford | Oct. 8, 1940 |
| 2,220,996 | Feigel | Nov. 12, 1940 |
| 2,223,716 | Bojensen | Dec. 3, 1940 |
| 2,225,121 | Lundquist | Dec. 13, 1940 |
| 2,283,965 | Brancolino | May 26, 1942 |

FOREIGN PATENTS

| Number | Country | Date |
|---|---|---|
| 432,124 | Great Britain | July 18, 1935 |
| 460,149 | Great Britain | Jan. 19, 1937 |
| 743,191 | France | Mar. 25, 1933 |
| 851,130 | France | Sept. 25, 1939 |